(12) United States Patent
Long

(10) Patent No.: US 7,954,838 B1
(45) Date of Patent: Jun. 7, 2011

(54) USER PROPELLED GOLF CART

(76) Inventor: John C. Long, Spring Branch, TX (US)

( * ) Notice: Subject to any disclaimer, the term of this patent is extended or adjusted under 35 U.S.C. 154(b) by 0 days.

(21) Appl. No.: 12/693,149

(22) Filed: Jan. 25, 2010

(51) Int. Cl.
*B62J 9/00* (2006.01)
*B62J 7/04* (2006.01)
*B60R 9/10* (2006.01)

(52) U.S. Cl. ............... 280/288.4; 280/202; 280/727

(58) Field of Classification Search ............ 280/7.15, 280/35, 62, 200, 202, 288.4, 304.5, 638, 280/727, 828
See application file for complete search history.

(56) References Cited

U.S. PATENT DOCUMENTS

| 2,630,334 | A | * | 3/1953 | Ewers | 280/288.4 |
|---|---|---|---|---|---|
| 2,707,111 | A | * | 4/1955 | Spenner | 280/202 |
| 3,222,034 | A | * | 12/1965 | Jackson | 254/325 |
| 3,664,683 | A | * | 5/1972 | Gobby | 280/202 |
| 3,713,502 | A | * | 1/1973 | Delaney et al. | 180/205 |
| 3,843,145 | A | * | 10/1974 | Templeton | 280/7.15 |
| 4,387,836 | A | | 6/1983 | Laesch | |
| 4,431,205 | A | * | 2/1984 | Speicher et al. | 280/282 |
| 4,635,835 | A | * | 1/1987 | Cole | 224/504 |
| 4,792,149 | A | | 12/1988 | Harmon | |
| 5,468,006 | A | * | 11/1995 | Delserro | 280/202 |
| 5,788,254 | A | | 8/1998 | Davis | |
| 5,863,058 | A | * | 1/1999 | Jinks | 280/202 |
| 6,039,227 | A | * | 3/2000 | Stark | 224/521 |
| D437,578 | S | * | 2/2001 | Stannard-Warne | D12/406 |
| 2003/0217874 | A1 | * | 11/2003 | Schoenberg | 180/2.2 |
| 2006/0043133 | A1 | * | 3/2006 | Bair | 224/519 |
| 2006/0151224 | A1 | | 7/2006 | Vasser | |
| 2010/0072726 | A1 | * | 3/2010 | Madsen | 280/202 |

FOREIGN PATENT DOCUMENTS

| DE | 2837778 A | * | 3/1980 |
|---|---|---|---|
| DE | 29914422 U1 | * | 12/1999 |
| FR | 2472172 A | * | 6/1981 |

* cited by examiner

*Primary Examiner* — Joanne Silbermann
*Assistant Examiner* — Daniel Yeagley
(74) *Attorney, Agent, or Firm* — Dale J. Ream

(57) ABSTRACT

A user propelled golf cart includes a frame having front and rear ends. A seat, pedal, and front wheel are operatively coupled to the frame. A plurality of rear wheels are rotatably coupled to the frame rear end to rotate about a common imaginary axis. The pedals operatively rotate at least one wheel about an imaginary axis. A tub is configured to receive a golf bag. A storage rack includes a first section configured to be removably coupled to the frame rear end, a second section configured to be removably coupled to the frame between the front and rear ends, and a support leg. The front wheel is raised above the rear wheels when the first section is coupled to the frame rear end, the second section is coupled to the frame, and the support leg contacts a ground surface or a receiving member.

9 Claims, 8 Drawing Sheets

USER PROPELLED GOLF CART

BACKGROUND OF THE INVENTION

This invention relates generally to golf carts and, more particularly, to a three-wheeled user propelled golf cart that provides a healthier, cost-effective, and environmentally beneficial alternative to a traditional golf cart.

Golfers frequently ride in battery or gasoline powered golf carts to maneuver about a golf course. In fact, some golf courses require the use of golf carts in order to keep players moving quickly and efficiently and to maximize the number of players who may use the course each day. Most golfers rent a golf cart from the golf course while some golfers actually purchase their own cart for maximum comfort, luxury, or to maintain familiarity with the same cart as they play different golf courses.

Although assumably effective for their intended purposes, a traditional golf cart may be expensive to own or even to rent on a regular basis. In addition, a traditional golf cart fails to provide the health benefits of walking the golf course or may even be dangerous and environmentally damaging. Still further, a traditional golf cart may be relatively difficult to transport and to store between uses.

Therefore, it would be desirable to have a user operated golf cart that provides an affordable and health-promoting alternative to a traditional golf cart. Further, it would be desirable to have a user operated golf cart that is environmentally friendly, safe, easy to transport, and easy to store.

SUMMARY OF THE INVENTION

A user propelled golf cart according to the present invention includes a frame having front and rear ends. A seat, pedal, and front wheel are operatively coupled to the frame. A plurality of rear wheels are rotatably coupled to the frame rear end to rotate about a common imaginary axis. The pedals operatively rotate at least one wheel about an imaginary axis. A tub is configured to receive a golf bag. A support bracket extends above the tub for supporting the golf bag in the tub. A storage rack includes a first section configured to be removably coupled to the frame rear end, a second section configured to be removably coupled to the frame between the front and rear ends, and a support leg. The front wheel is raised above the rear wheels when the first section is coupled to the frame rear end, the second section is coupled to the frame, and the support leg contacts a ground surface or a receiving member.

Therefore, a general object of this invention is to provide a user powered golf cart that is operable by rotating one or more wheels by pedal power supplied by the rider.

Another object of this invention is to provide a user powered golf cart, as aforesaid, that enables a user to maneuver about a golf course in a manner that promotes health and environmental friendliness.

Still another object of this invention is to provide a user powered golf cart, as aforesaid, that is to store and transport.

A further object of this invention is to provide a user powered golf cart, as aforesaid, that is user-friendly to use and cost-effective to manufacture.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 5b is an isolated view on an enlarged scale taken from a portion of FIG. 5a;

DESCRIPTION OF THE PREFERRED EMBODIMENT

User propelled golf carts according to the present invention will now be described in detail with reference to FIGS. 1 through 4b of the accompanying drawings. More particularly, a user propelled golf cart 100 according to one embodiment includes a frame 110 and a storage rack 150.

Figure 1:
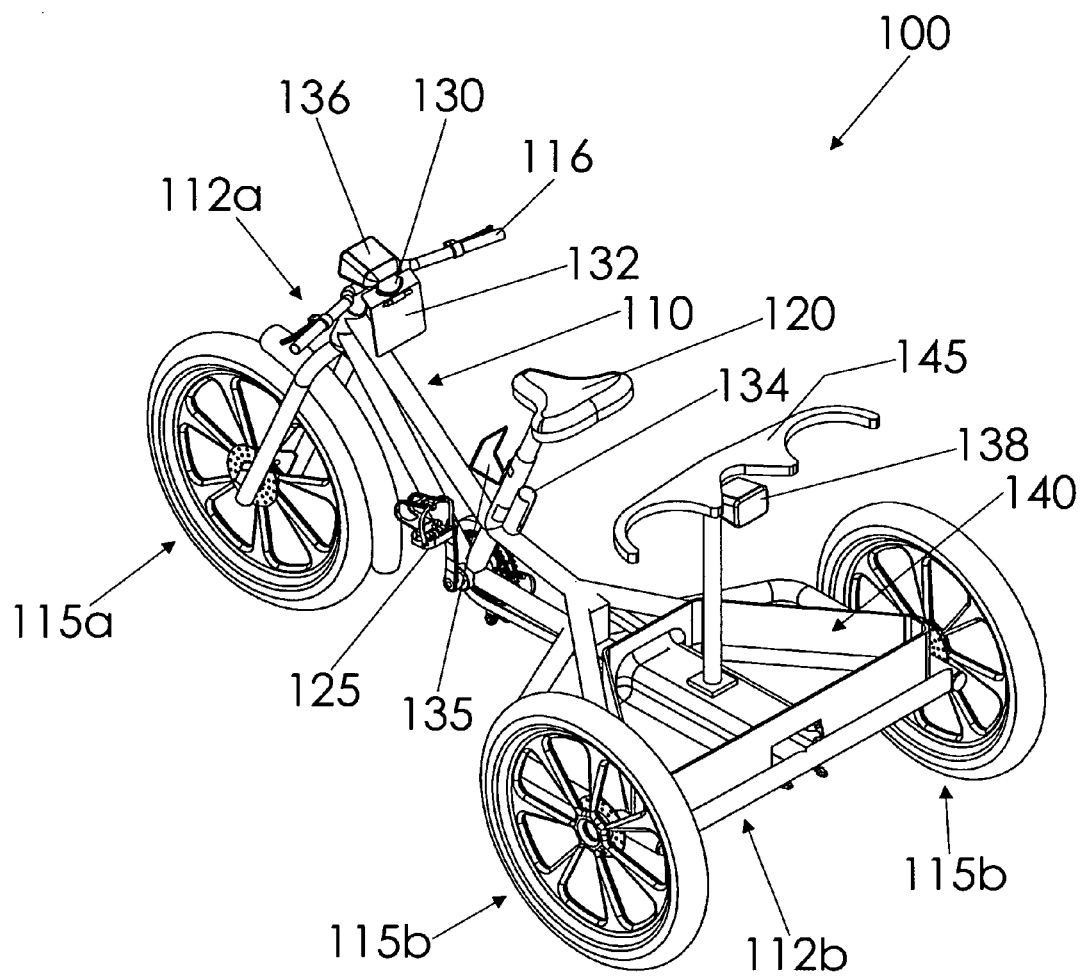
FIG. 1 is a perspective view of a user propelled golf cart according to a preferred embodiment of the present invention.
Figure 2:
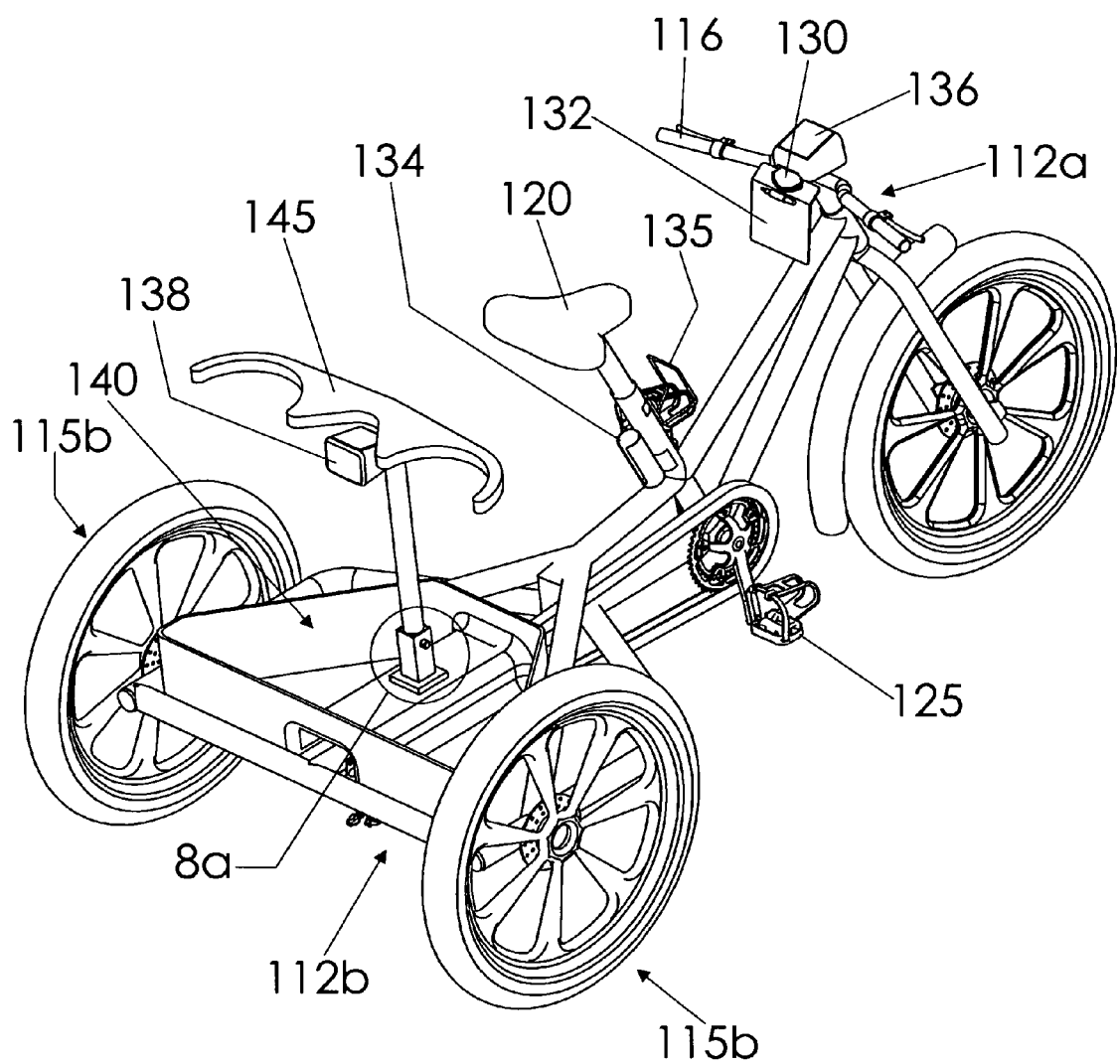
FIG. 2 is a perspective view from another angle of the golf cart as in FIG. 1.

As shown in FIG. 1 and FIG. 2, the frame 110 has front and rear ends 112a, 112b. A front wheel 115a is operably coupled to the frame front end 112a and is rotatable about an imaginary center axis and about an imaginary steering axis. In some embodiments, as shown in the drawings, the golf cart 100 may have a single front wheel 115a. Means for rotating the front wheel 115a about the imaginary steering axis are included. For example, a handle (e.g., handle bars 116, a steering wheel, etc.) may be operatively coupled to the front wheel 115a for rotating the front wheel 115a about the imaginary steering axis.

A plurality of rear wheels 115b are rotatably coupled to the frame rear end 112b to rotate about a common imaginary axis. In some embodiments, as shown in the drawings, two rear wheels 115b are included. Each rear wheel 115b may be independently rotatable about the common imaginary axis relative to each other rear wheel 115b. For example, each rear wheel 115b may include a freewheel mechanism to provide differential action when the golf cart 100 turns. A braking device may be in communication with at least one of the wheels 115a, 115b, as will be appreciated by those skilled in the art.

A seat 120 and a pedal 125 are operatively coupled to the frame 110, and the frame 110 may be generally linear adjacent the seat 120 such that a user straddles the frame 110 when sitting on the seat 120 and operating the pedal 125. A plurality of pedals 125 may be rotatably coupled to the frame 110, as shown in the drawings, or pedal 125 may be movable (for example) along a generally linear or arcuate path. Means are included for rotating at least one wheel 115a, 115b using force input through the pedal 125. For example, a chain and sprocket system or any other appropriate force transferring system may be used to rotate at least one wheel 115a, 115b using force input through the pedal 125. Though not specifically shown in the drawings, gearing such as that used in bicycle transmission systems may be included in the force transferring system, as will be appreciated by those skilled in the art.

Still referring to FIG. 1 and FIG. 2, an inclinometer 130 may be operatively coupled to the frame 110. Though not shown in detail, the inclinometer 130 may include a weighted indicator and indicia that aligns with the weighted indicator to denote a plurality of safety zones corresponding to relative amounts of inclination (e.g., lateral inclination). Additionally, or alternately, a score card 132, a golf ball holder 134, a drink holder 135, a headlight 136, and/or a taillight 138 may be operatively coupled to the frame 110. Means for powering the headlight 136 and the taillight 138, such as a battery charged using solar energy or energy from the pedal 125 may be included.

A tub 140 may be operatively coupled to the frame 110 (e.g., at the rear end 112b) and configured to receive a golf bag. A support bracket 145 may extend above the tub 140 for supporting the golf bag in the tub 140, and it may be preferable for the support bracket 145 to be removably coupled to the tub 140.

Figure 3:
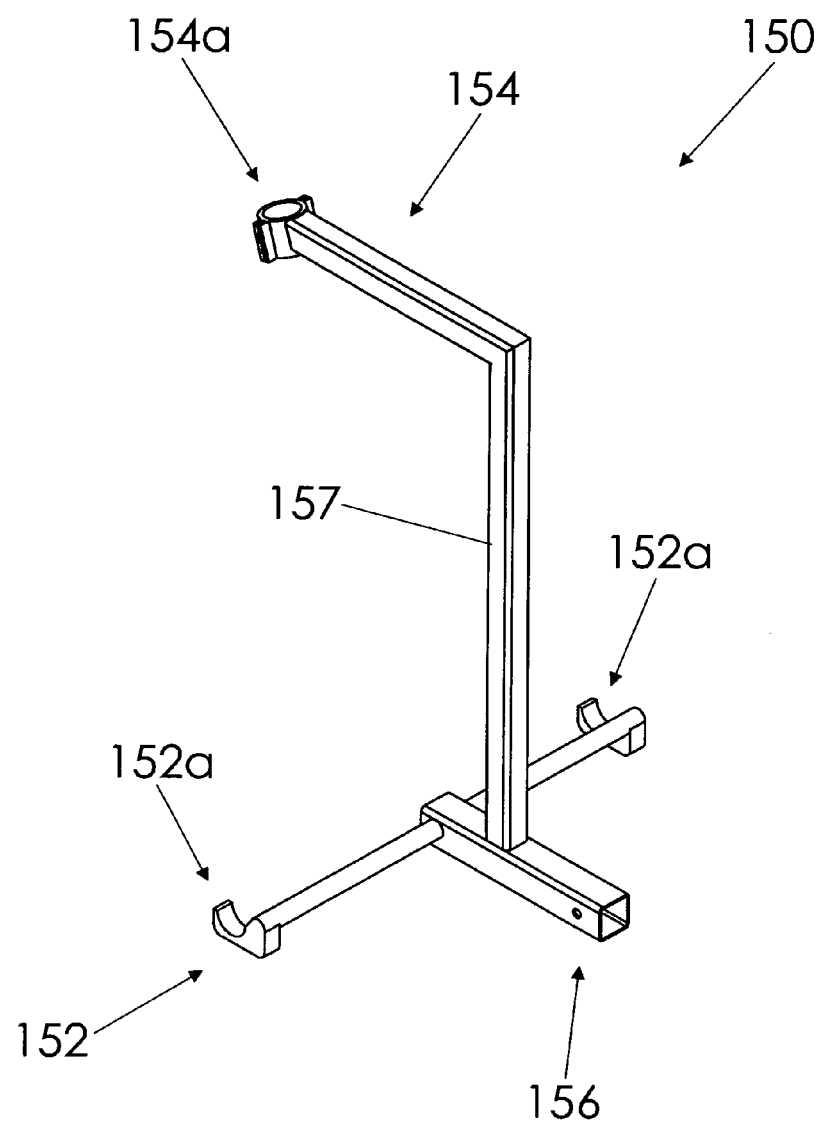
FIG. 3 is a perspective view of a storage rack according to the present invention.
Figure 5A:
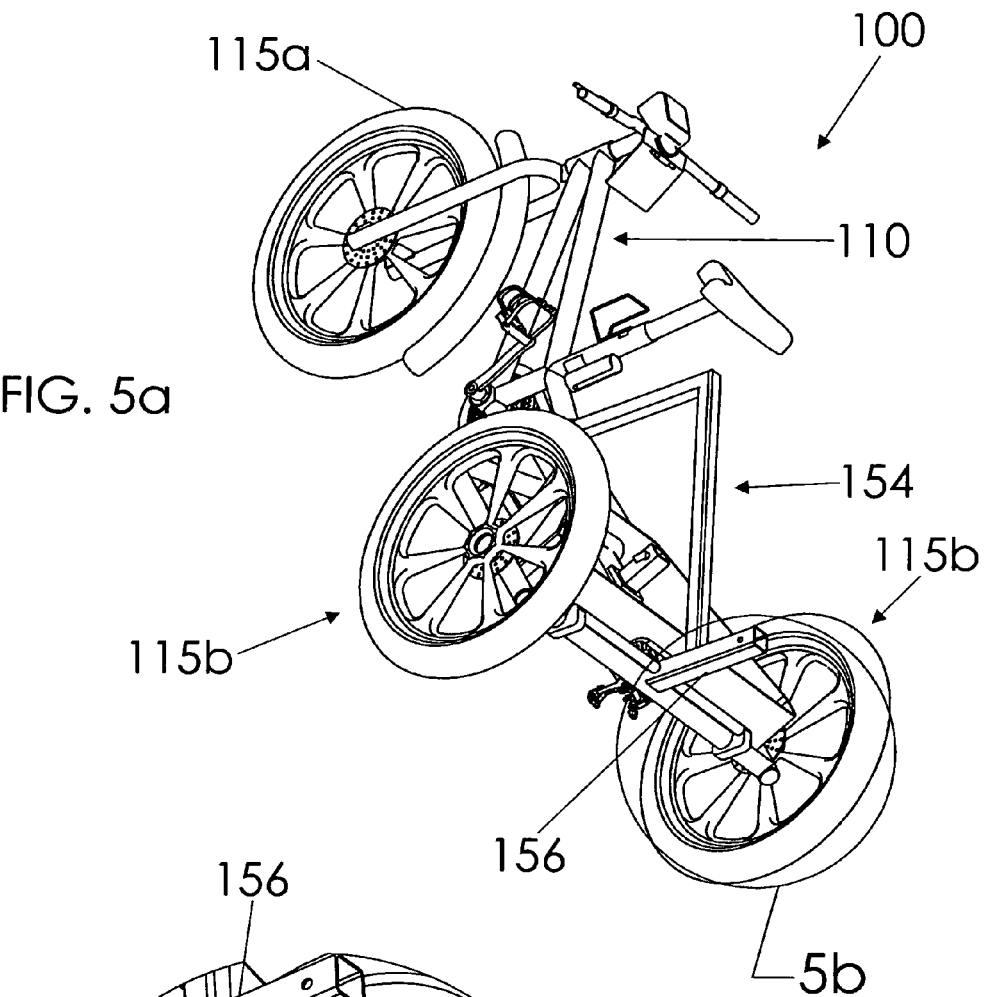
FIG. 5a is a rear perspective view of the golf cart as in FIG. 1.
Figure 5B:
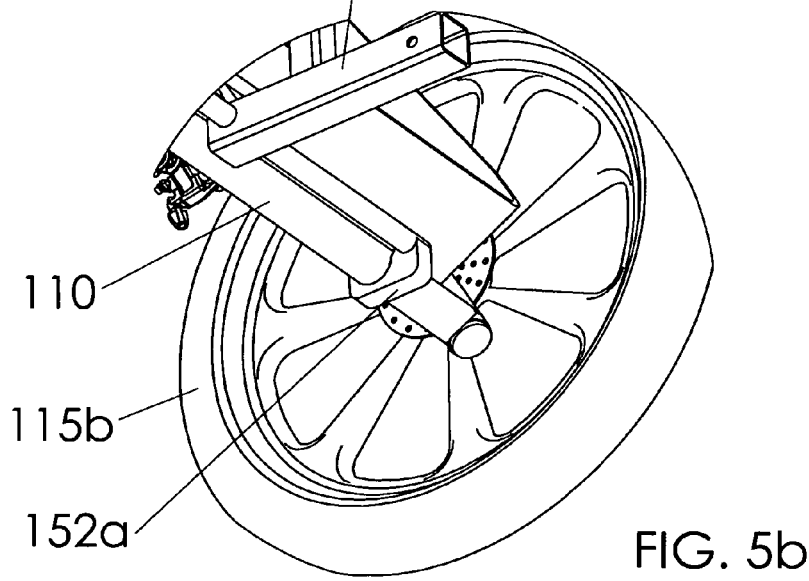

Turning now to FIGS. 3, 5a and 5b, the storage rack 150 has a first section 152 configured to be removably coupled to the frame rear end 112b, a second section 154 configured to be removably coupled to the frame 110 between the front and rear ends 112a, 112b, and a support leg 156. The first section 152 may include at least one hook 152a (FIG. 3) for removably coupling the storage rack 150 to the frame 110, and the second section 154 may include at least one clamp 154a for removably coupling the storage rack 150 to the frame 110. As shown in FIG. 3, the support leg 156 may be generally linear, the first section 152 may extend outwardly in two directions from one end of the support leg 156 such that the support leg 156 is generally centered along the first section 152, an arm 157 may extend upwardly from the support leg 156 between ends of the support leg 156, and the second section 154 may extend from the arm 157 such that the second section 154 is generally parallel to the support leg 156.

Figure 4:
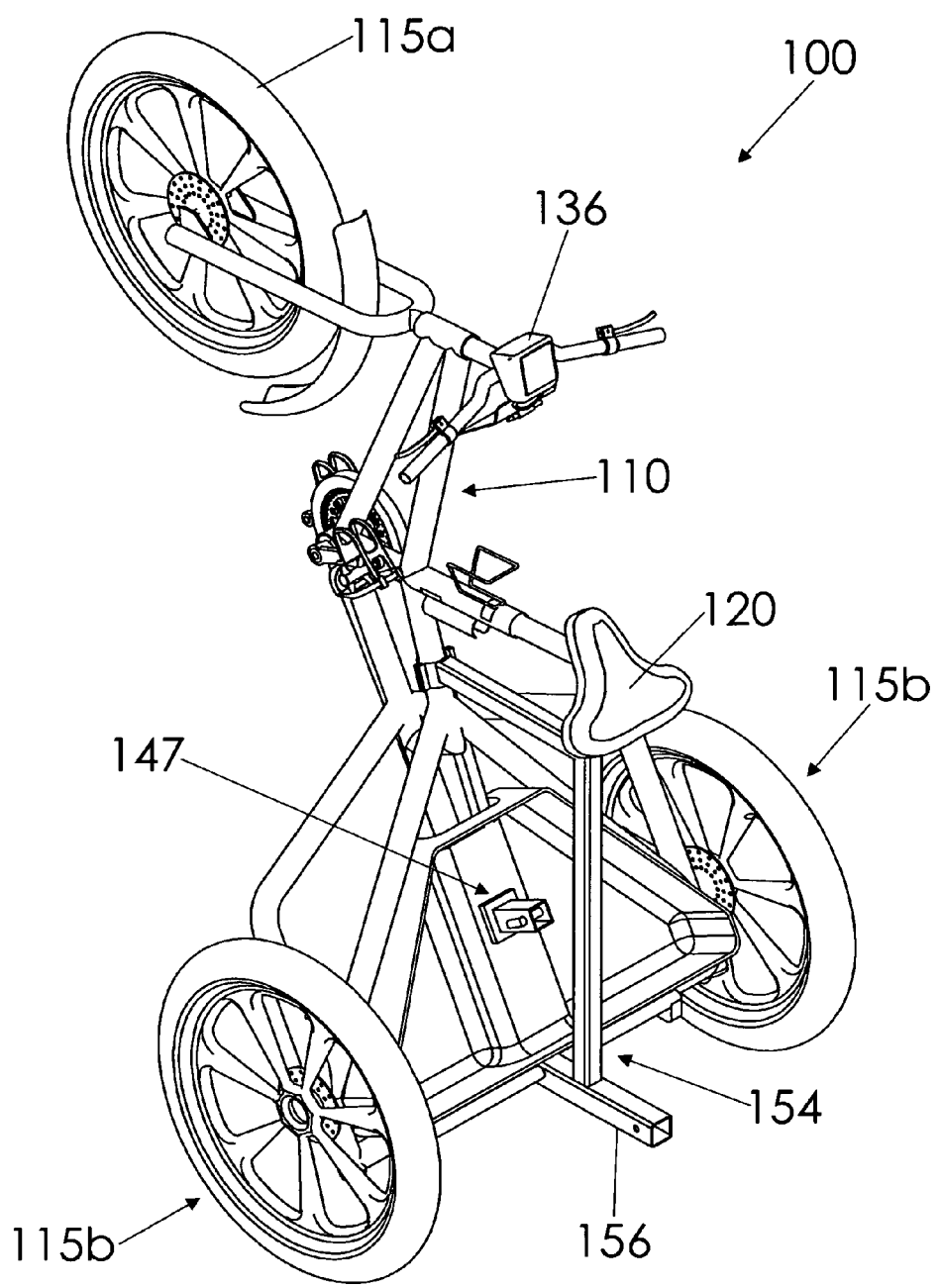
FIG. 4 is a perspective view of the golf cart as in FIG. 1 tipped up to a rear standing position for storage.

As shown in FIG. 4, the front wheel 115a may be raised above the rear wheels 115b when the first section 152 is coupled to the frame rear end 112b, the second section 154 is coupled to the frame 110, and the support leg 156 contacts a ground surface or a receiving member. The receiving member may be, for example, a trailer hitch, and the support leg 156 may be configured to be removably coupled to the trailer hitch.

Figure 6:
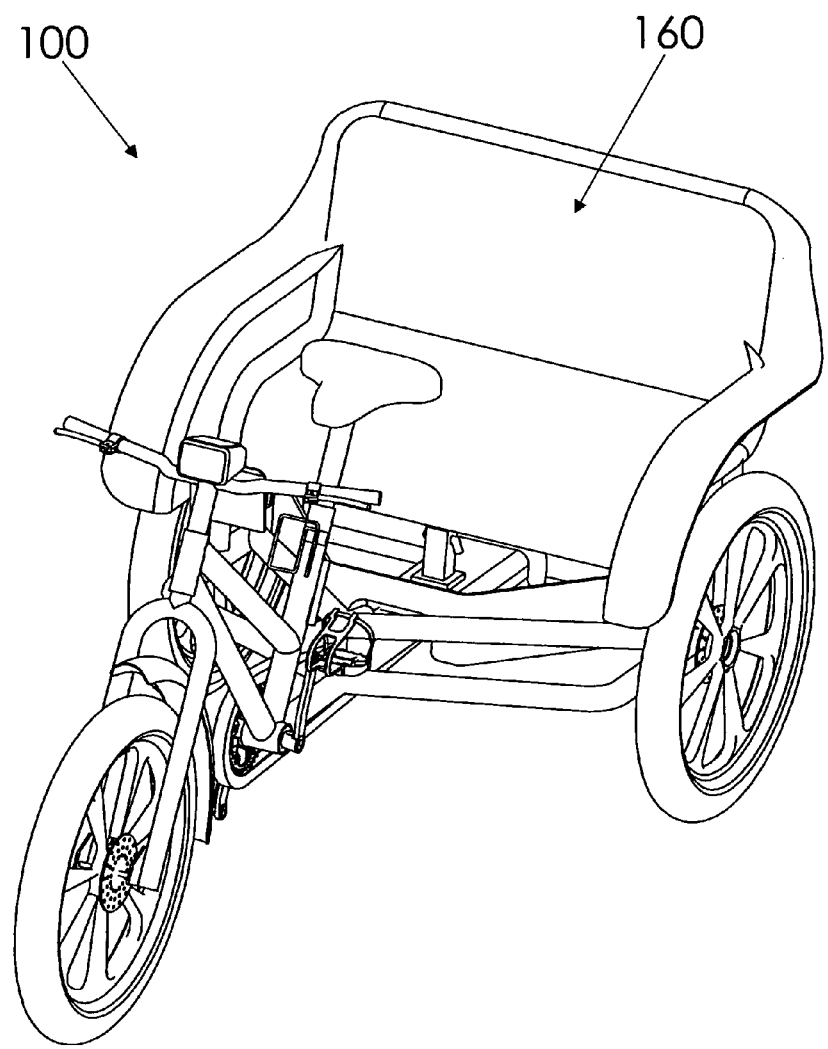
FIG. 6 is a front perspective view of a user propelled golf cart according to another embodiment of the present invention.

As shown in FIG. 6, the support bracket 145 may be removed from the tub 140 and replaced with a bench seat 160. As shown, the bench seat 160 includes a width and depth that are larger than the seat 120 and having both bottom and back portions so as to be suitable for supporting one or more riders, such as a child or children. It is understood that the bench seat 160 may be supported upon a post similar to the support bracket 145 or removably mounted to said frame 110 rearward of said seat 120.

Figure 7:
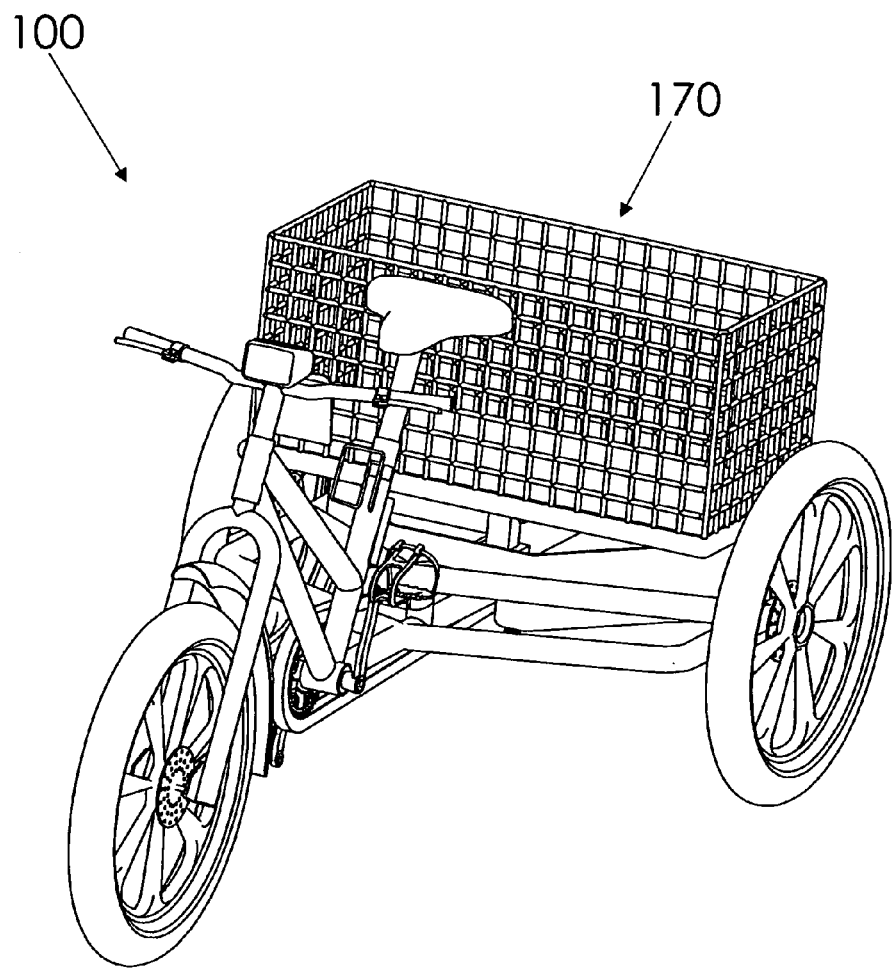
FIG. 7 is a front perspective view of a user propelled golf cart according to yet another embodiment of the present invention.

Similarly, a basket 170 may be mounted to the tub 140 in place of the removable support bracket 145 (FIG. 7). As with the bench seat 160, the basket 170 may be mounted by a support rod similar to the support bracket 145 or removably mounted to said frame 110 rearward of said seat 120. The basket 170 may include a construction having porous walls such a grate or a grill so as to allow wind and rain to pass therethrough although a solid bottom wall is preferred so as to hold items while shopping or participating in leisure activities other than playing golf.

Figure 8A:
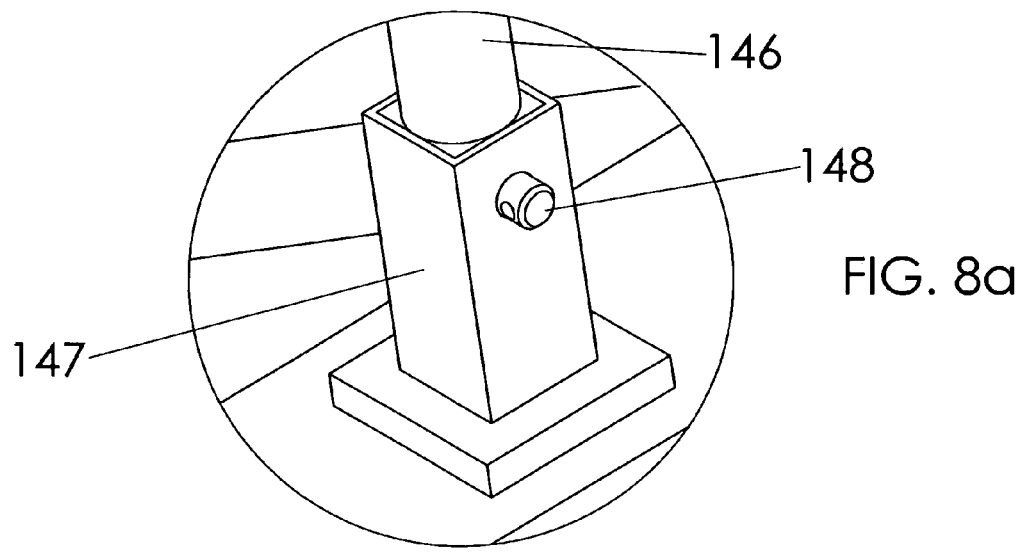
FIG. 8a is an isolated view on an enlarged view of a mounting bracket shown in a locked configuration.
Figure 8B:
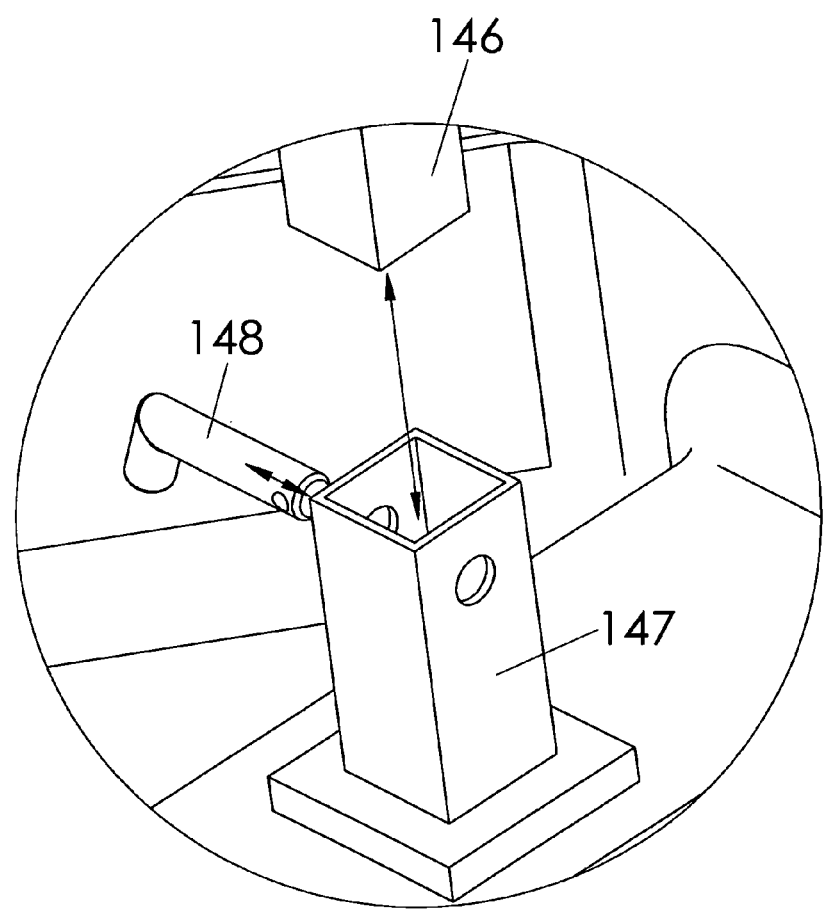
FIG. 8b is an isolated view on an enlarged view of the mounting bracket shown in a released configuration.

As shown in FIG. 2, the support bracket 145 may include an adjustable mounting member 147. As more particularly shown in FIGS. 8a and 8b, the adjustable mounting member 147 may include a configuration that receives a post 146 of the mounting bracket 145 for relative movement therein. The adjustable mounting member 147 also includes a removable pin 148 that is selectively insertable to hold the post 146 in a locked configuration or released to enable the post to be vertically adjusted. Accordingly, the post 146 is vertically adjustable such that the support bracket 145 is able to support golf bags of varied heights.

In use, an operator (or "user") may easily step one leg over the generally linear portion of the frame 110 and sit on the seat 120, straddling the frame 110. To propel the golf cart 100, the user may move the pedal 125, and the force from the pedal may be transferred to at least one wheel 115a, 115b, as set forth above. The handle bars 116 may be used to rotate the front wheel 115 about the imaginary steering axis to steer the cart 100. The inclinometer 130 may be referenced to determine if the cart 100 is safe to operate at different levels of lateral inclination, helping the operator avoid tipping the cart 100 over.

One or more golf bag may be held in the tub 140 and supported by the support bracket 145. The score card 132 may be used to keep a golf score, the golf ball holder 134 may hold one or more golf ball, and the drink holder 135 may hold a drink (e.g., a cup, bottle, etc.). The headlight 136 and taillight 138 may be used to operate the cart 100 in low light conditions.

To transport or store the golf cart 100, the first section 152 may be coupled to the frame 110 (e.g., using the hooks 152a) and the second section 154 may be coupled to the frame 110 (e.g., using the clamp 154a). If being transported, the support leg 156 may be received in a trailer hitch or other receiving member.

It is understood that while certain forms of this invention have been illustrated and described, it is not limited thereto except insofar as such limitations are included in the following claims and allowable functional equivalents thereof.

The invention claimed is:

1. A user propelled golf cart, comprising:
    a frame having front and rear ends;
    a seat operatively coupled to said frame;
    a pedal operatively coupled to said frame;
    a front wheel operably coupled to said frame front end, said front wheel being rotatable about an imaginary center axis and about an imaginary steering axis;
    a plurality of rear wheels rotatably coupled to said frame rear end to rotate about a common imaginary axis;
    means for rotating at least one said wheel using force input through said pedal;
    means for rotating said front wheel about said imaginary steering axis;
    a tub configured to receive a golf bag;
    a support bracket extending above said tub for supporting said golf bag in said tub, said support bracket is removably coupled to said tub;
    a storage rack having a first section configured to be removably coupled to said frame rear end, a second section configured to be removably coupled to said frame between said front and rear ends, and a support leg; said front wheel being raised above said rear wheels when said first section is coupled to said frame rear end, said second section is coupled to said frame, and said support leg contacts a ground surface or a receiving member;
    an inclinometer operatively coupled to said frame;
wherein:
    said receiving member is a trailer hitch;
    said support leg is configured to be removably coupled to said trailer hitch;
    said first section includes a hook for removably coupling said storage rack to said frame;

said second section includes a clamp for removably coupling said storage rack to said frame.

2. The cart of claim 1, further comprising a score card operatively coupled to said frame and a golf ball holder operatively coupled to said frame.

3. The cart of claim 2, further comprising:
a headlight operatively coupled to said frame;
a taillight operatively coupled to said frame;
means for powering said headlight and said taillight;
a braking device in communication with at least one said wheel; and
a drink holder operatively coupled to said frame.

4. The cart of claim 3, wherein said cart includes exactly one front wheel and two rear wheels.

5. The cart of claim 4, wherein said frame is generally linear adjacent said seat such that a user straddles said frame when sitting on said seat and operating said pedal.

6. The cart of claim 1, wherein each said rear wheel is independently rotatable about said common imaginary axis relative to each other said rear wheel.

7. A user propelled golf cart, comprising:
a frame having front and rear ends;
a seat operatively coupled to said frame;
a pedal operatively coupled to said frame;
a front wheel operably coupled to said frame front end, said front wheel being rotatable about an imaginary center axis and about an imaginary steering axis;
a plurality of rear wheels rotatably coupled to said frame rear end to rotate about a common imaginary axis;
means for rotating at least one said wheel using force input through said pedal;
a handle operatively coupled to said front wheel for rotating said front wheel about said imaginary steering axis;
a storage rack having a first section configured to be removably coupled to said frame rear end, a second section configured to be removably coupled to said frame between said front and rear ends, and a support leg; said front wheel being raised above said rear wheels when said first section is coupled to said frame rear end, said second section is coupled to said frame, and said support leg contacts a ground surface or a receiving member;
an inclinometer operatively coupled to said frame;
wherein:
said first section includes a hook for removably coupling said storage rack to said frame;
said second section includes a clamp for removably coupling said storage rack to said frame;
said support leg is generally linear;
said first section extends outwardly in two directions from one end of said support leg such that said support leg is generally centered along said first section;
an arm extends upwardly from said support leg between ends of said support leg; and
said second section extends from said arm such that said second section is generally parallel to said support leg.

8. The cart of claim 7 further comprising a bench seat removably mounted to said frame rearward of said seat, said bench seat having a width larger than a width of said seat and having bottom and back portions.

9. The cart of claim 8 further comprising a basket removably mounted to said frame rearward of said seat, said basket having a bottom and a plurality of side walls extending upwardly from said bottom.

* * * * *